United States Patent
Nelson et al.

(10) Patent No.: US 6,173,968 B1
(45) Date of Patent: Jan. 16, 2001

(54) SEALING RING ASSEMBLY

(75) Inventors: Steven D. Nelson, Redondo Beach; Robert E. Borate, Santa Monica, both of CA (US)

(73) Assignee: TRW Inc., Redondo Beach, CA (US)

(*) Notice: Under 35 U.S.C. 154(b), the term of this patent shall be extended for 0 days.

(21) Appl. No.: 09/300,581

(22) Filed: Apr. 27, 1999

(51) Int. Cl.[7] .................................................. F16L 17/00
(52) U.S. Cl. ........................... 277/619; 277/584; 285/350
(58) Field of Search ................................... 277/619, 624, 277/626, 631, 644, 584; 285/349, 350

(56) References Cited

U.S. PATENT DOCUMENTS

| | | | |
|---|---|---|---|
| 2,494,598 | * | 1/1950 | Waring . |
| 2,735,700 | * | 2/1956 | Bowan et al. . |
| 3,373,999 | * | 3/1968 | Jepsen . |
| 3,582,093 | * | 6/1971 | Lucien . |
| 3,687,465 | * | 8/1972 | Grime et al. . |
| 3,949,961 | * | 4/1976 | Pamer . |
| 4,468,041 | * | 8/1984 | Yoshimura et al. . |
| 4,556,227 | * | 12/1985 | Sato et al. . |
| 4,840,379 | * | 6/1989 | Thoman, Jr. . |
| 5,123,662 | * | 6/1992 | Sugimura . |

* cited by examiner

*Primary Examiner*—Terry Lee Melius
*Assistant Examiner*—William L. Miller
(74) *Attorney, Agent, or Firm*—Michael S. Yatsko

(57) ABSTRACT

A sealing ring assembly for sealing a joint between two members (20, 22). An annular sealing ring 28 abuts an annular backup ring (38, 44) of substantially the same diameter. The annular backup ring is split to permit radial expansion and has a greater thickness on its outer periphery than on its inner periphery. When the joint being sealed (24) is under high pressure, the sealing ring urges the backup ring to expand radially to cover any gap (32) between the members being sealed, maintaining the seal, even under high temperature conditions, and preventing the sealing ring from extruding into the gap.

18 Claims, 2 Drawing Sheets

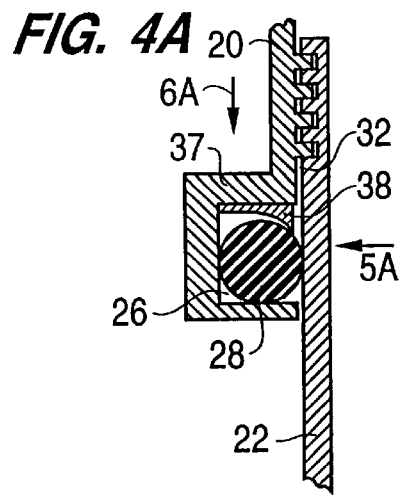
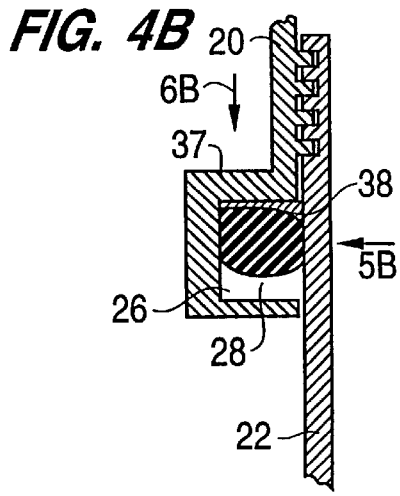
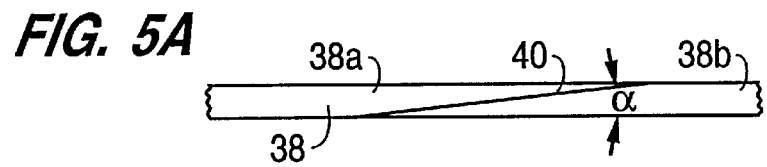
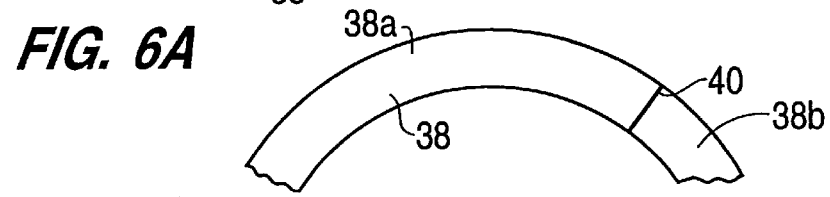
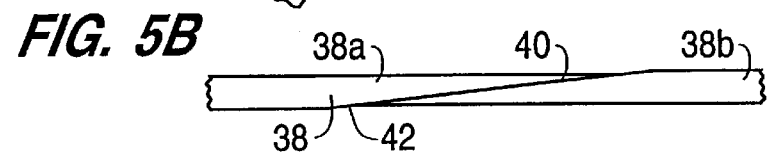
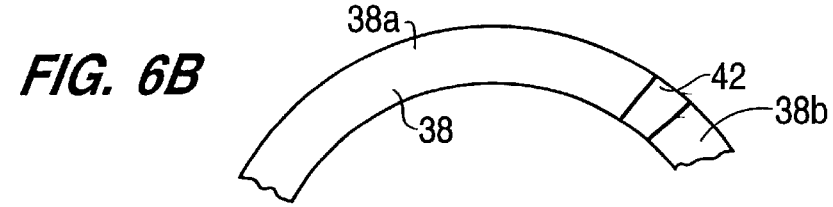
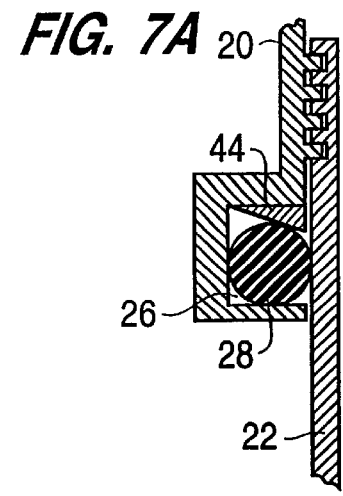
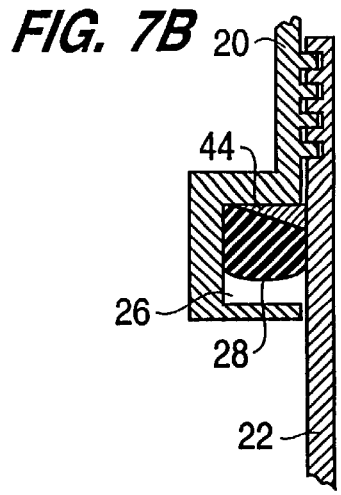

SEALING RING ASSEMBLY

STATEMENT REGARDING FEDERALLY SPONSORED RESEARCH OR DEVELOPMENT

This invention was made with Government support under contract number DAAH01-93-C-R243 awarded by the United States Army. The Government has certain rights in the invention.

FIELD OF THE INVENTION

The present invention pertains to a sealing ring assembly. More particularly, the present invention pertains to a sealing ring assembly including an annular sealing ring and an annular backup ring positioned adjacent the annular sealing ring. The annular backup ring is split to permit radial expansion and has a greater thickness on its outer periphery than on its inner periphery. As a consequence, when the sealing ring assembly is used to seal a joint between two members, such as pipes, in a high pressure application, the annular sealing ring presses against the annular backup ring, causing the annular backup ring to expand radially to cover any gap that might exist between the two members, and so inhibiting extrusion of the sealing ring into such gap.

BACKGROUND OF THE INVENTION

Annular sealing rings, often referred to o-rings, are frequently utilized to provide a fluid seal between two members, such as two pipes, threaded or otherwise joined together. In the absence of a sealing ring, fluid within the pipes might leak through gaps at the joint at which the two members are connected.

Sealing rings are commercially available and are often made of a resilient, rubber-like material, for example rubber, ethylene, or propylene. Such materials are commercially available under the trademarks VITON and KALREZ. These sealing rings provide satisfactory sealing at comparatively low pressures and temperatures. However, at higher pressures and temperatures, for example pressures in excess of 3400 psia and temperatures in excess of 300° F., these sealing rings do not always work satisfactorily. The high temperature might cause expansion of the members being joined, with resultant expansion of any gaps at the joint. The high temperature also might soften the material of the sealing ring. The high pressure then might result in extrusion of the sealing ring into the enlarged gaps. This can result in damage to the sealing ring. When the high pressure and high temperature condition ends, the members being joined contract, but any extruded portion of the sealing ring might not withdraw from the previously enlarged gap. In that event, the sealing ring may be damaged, and when the high pressure and high temperature condition is next experienced, the damaged sealing ring may not provide an adequate seal. This problem is exacerbated with each cycle of high pressure and high temperature.

SUMMARY OF THE INVENTION

The present invention is a sealing ring assembly for sealing a joint between two members. An annular backup ring is positioned downstream of an annular sealing ring of substantially the same diameter. The annular backup ring is split to permit radial expansion and has a greater thickness on its outer periphery than on its inner periphery. When the joint being sealed is under high pressure, the sealing ring urges the backup ring to expand radially to cover any gap between the members being sealed, maintaining the seal even under high temperature conditions, and preventing the sealing ring from extruding into the gap. The sealing ring is made of a resilient rubber-like material such as rubber, ethylene or propylene, for example a VITON™ or KALREZ™ material, while the backup ring is preferably made of a strong, rigid material, such as a metal, for example aluminum, titanium or steel.

BRIEF DESCRIPTION OF THE DRAWINGS

These and other aspects and advantages of the present invention are more apparent from the following detailed description of the claims, particularly when considered in conjunction with the accompanying drawings. In the drawings:

FIGS. 4A and 4B are fragmentary sectional views, taken along, line 2—2 of FIG. 1, illustrating a first embodiment of a sealing ring assembly in accordance with the present invention under different conditions;

FIGS. 5A and 5B are fragmentary plan views of an annular backup ring in accordance with the present invention under different conditions and are taken, respectively, in the direction of arrow 5A in FIG. 4A and in the direction of arrow 5B in FIG. 4B;

FIGS. 6A and 6B are fragmentary elevational views of the annular backup ring under different conditions and are taken, respectively, in the direction of arrow 6A in FIG. 4A and in the direction of arrow 6B in FIG. 4B; and FIGS. 7A and 7B are fragmentary sectional views, taken along line 2—2 of FIG. 1, illustrating a second embodiment of a sealing ring assembly in accordance with the present invention under different conditions.

DETAILED DESCRIPTION

Figure 1:
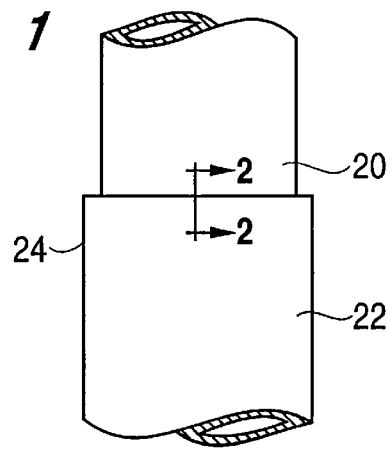
FIG. 1 is a fragmentary elevational view of two pipe members coupled together in a joint incorporating a sealing ring, assembly in accordance with the present invention.
Figure 2A:
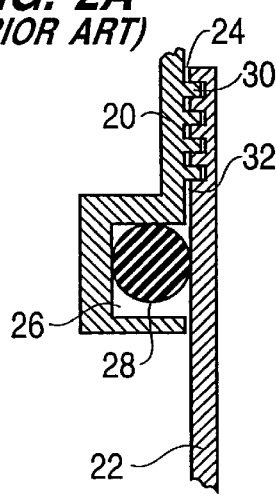
FIGS. 2A, 2B, and 2C are fragmentary sectional views, taken along line 2—2 of FIG. 1, illustrating one form of a conventional sealing ring assembly under different conditions.

FIG. 1 illustrates a first pipe member 20 having one end inserted within one end of a second pipe member 22. The area adjacent junction 24 of pipes 20 and 22 thus constitutes a pipe joint. FIG. 2A depicts a first form of a conventional sealing ring assembly which might be utilized to seal joint 24. Within outer pipe 22, inner pipe 20 terminates in a gland or cavity 26 within which a sealing ring 28 is provided. In the illustrative example of FIG. 2A, inner pipe 20 and outer pipe 22 include threaded sections 30 which threadingly mate to join the inner pipe and outer pipe together; however, the sealing ring assembly of the present invention is usable at junctions or joints of members, including pipe members, that are not threaded.

Although the outer diameter of inner pipe 20 and the inner diameter of outer pipe 22 are selected such that the two pipes fit together snugly at joint 24, nevertheless, a slight gap or crevice 32 may exist at joint 24, permitting fluid flow through threaded sections 30 to the outside of the pipes. Sealing ring 28 is provided within cavity 26 to inhibit fluid flow from the interior of pipes 20 and 22 through gap 32 to the outside of the pipes, as well as fluid flow through the gap in the opposite direction.

Figure 2B:
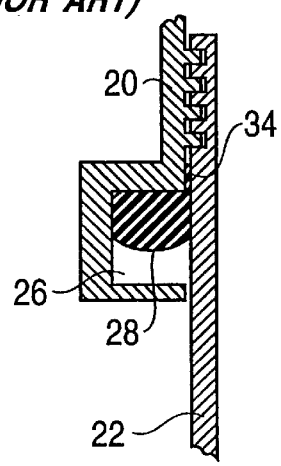

If the fluid within pipes 20 and 22 is at a high pressure, for example a pressure in excess of 3400 psia, that high pressure can deform sealing ring 28 by compressing it. A portion 34 of sealing ring 28 may then extrude into gap 32, damaging sealing ring 28, as illustrated in FIG. 2B. When the high pressure condition ends, nothing withdraws extruded portion 34 from gap 32. When the high pressure condition returns, further damage may occur to sealing ring 28.

Figure 2C:
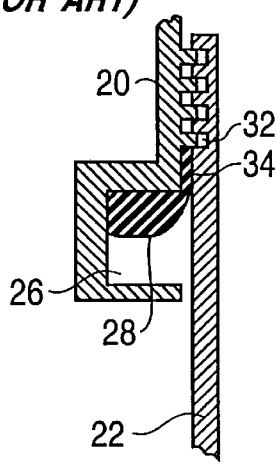

If the fluid within pipes 20 and 22 is at a high temperature, for example a temperature in excess of 300° F., then pipes 20 and 22 are likely to expand. If pipes 20 and 22 do not have substantially the same coefficient of thermal expansion, then gap 32 may change size. If the gap narrows, sealing ring 28 is likely to be further damaged. If the gap enlarges, the high pressure may force more of sealing ring 28 to extrude into gap 32. In addition, the high temperature might soften sealing ring 28, increasing the likelihood and amount of extrusion of the sealing ring into gap 32. Consequently, the combination of the high temperature and high pressure can result in significant damage to sealing ring 28, as depicted in FIG. 2C.

The damage is exacerbated if the high pressure, high temperature condition at joint 24 cycles on and off. When the pressure decreases, there is nothing to cause extruded portion 34 to withdraw from crevice 32. When the temperature decreases, pipes 20 and 22 contract, compressing the extruded portion 34. Repeated cycling of the high pressure, high temperature condition may result in further damage to sealing ring 28.

Figure 3A:
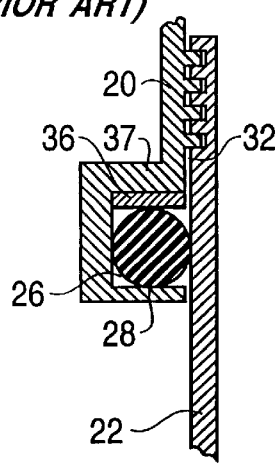
FIGS. 3A, 3B and 3C are fragmentary sectional views, taken along, line 2—2 of FIG. 1, illustrating, another form of a conventional sealing ring, assembly under different conditions.
Figure 3B:
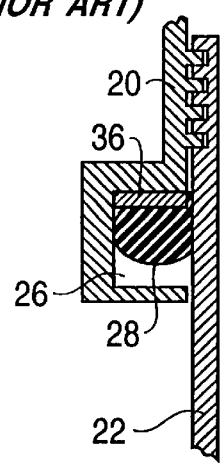
Figure 3C:
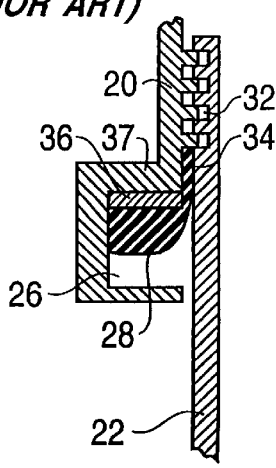

FIG. 3A illustrates a conventional manner of overcoming this problem by positioning a backup ring 36 in cavity 26, between sealing ring 28 and downstream wall 37 of cavity 26. In the low pressure, low temperature condition depicted in FIG. 3A, sealing ring 36 prevents sealing ring 28 from entering crevice 32. FIG. 3B illustrates such a sealing ring assembly subjected to high pressure within pipes 20 and 22. The high pressure may force some extrusion of sealing ring 28 into the gap between backup ring 36 and the wall of pipe 22, and possibly into gap 32. If a high temperature causes gap 32 to enlarge, a portion of sealing ring 28 may extrude past backup ring 36 into gap 32, as depicted in FIG. 3C. Thus, a conventional backup ring, such as backup ring 36, does not adequately overcome the problem.

FIGS. 4A and 4B depict a first embodiment of a sealing ring assembly in accordance with the present invention which overcomes this problem in conventional sealing ring assemblies. As depicted in FIG. 4A, a backup ring 38 is positioned in cavity 26, between sealing ring 28 and downstream wall 37 of cavity 26. Whereas backup ring 36, depicted in FIGS. 3A, 3B and 3C, has a substantially rectangular cross-section, the cross-section of backup ring 38 depicted in FIGS. 4A and 4B, is substantially straight on its downstream surface facing wall 37 of cavity 26 and arcuate on its upstream surface facing sealing ring 28. Preferably, the curvature of the arcuate surface of backup ring 38 substantially matches the curvature of the cross section of sealing ring 28.

Rather than being an unbroken ring, backup ring 38 has a split in it. Consequently, as illustrated in FIG. 4B, when the sealing ring assembly including split backup ring 38 is subjected to a high pressure and high temperature, sealing ring 28 compresses and pushes against backup ring 38, forcing backup ring 38 to enlarge circumferentially. Consequently, backup ring 38 moves radially outward to cover crevice 32, preventing sealing ring 28 from entering the crevice. The split permits backup ring 38 to enlarge as it is forced radially outwardly by sealing ring 28.

FIG. 5A depicts the circumferentially outer surface of backup ring 38 under the low pressure and low temperature conditions of FIG. 4A, when backup ring 38 is not enlarged, and is taken in the direction of arrow 5A in FIG. 4A. FIG. 6A is an elevational view illustrating the surface of backup ring 38 that faces downstream wall 37 in this condition and is taken in the direction of arrow 6A in FIG. 4A. Portions 38a and 38b, adjacent split 40, abut at the split, as illustrated in FIGS. 5A and 6A.

FIG. 5B illustrates the outer circumferential surface of backup ring 38 under the high pressure and high temperature conditions of FIG. 4B when the backup ring is enlarged, and is taken in the direction of arrow 5B in FIG. 4B. FIG. 6B is an elevational view illustrating the surface of backup ring 38 that faces downstream wall 37 under the high pressure and high temperature condition and is taken in the direction of arrow 6B in FIG. 4B. The pressure exerted on the arcuate surface of backup ring 38 forces the backup ring to expand radially, and so portions 38a and 38b of backup ring 38 move apart at split 40 as illustrated in FIGS. 5B and 6B. As a consequence, as depicted in FIG. 4B, backup ring 38 moves radially outwardly to abut the inner surface of outer pipe 22, positioning the backup ring to cover gap 32, thereby sealing the crevice and preventing extrusion of sealing ring 28 into the crevice.

Preferably, split 40 is angled with respect to the two faces of backup ring 38, as depicted in FIGS. 5A and 6A. The split preferably forms an acute angle α with the downstream annular surface of backup ring 38 as depicted in FIG. 5A, more preferably an angle of less than 10°, and most preferably an angle in the order of about 5°. As a result, even when backup ring 38 is expanded, resulting in an area 42 between portions 38a and 38b, as illustrated in FIGS. 5B and 6B, still there is no gap through the backup ring, and so no path for ready extrusion of a portion of sealing ring 28.

FIGS. 7A and 7B illustrate an alternative embodiment of a backup ring 44 differing from annular backup ring 38 by having a substantially triangular cross section. In a preferred embodiment the substantially triangular cross section has angles of 30°, 60°, and 90°.

Following are test data regarding tests on sealing ring assemblies of the prior art and in accordance with the present invention.

| Sealing Ring Material | Backup Ring Material | Backup Ring Design | Gap Width (inches) | Temperature (° F.) | Pressure (psia) | Failure |
|---|---|---|---|---|---|---|
| Viton 884-75 | None | — | 0.008 | 300 | 3250 | Yes |
| Viton 884-75 | None | — | 0.010 | 300 | 3250 | Yes |
| Viton 884-75 | Teflon | Rectangular; no split | 0.010 | 300 | 3600 | No |
| Viton 884-75 | Teflon | Rectangular; no split | 0.008 | 314 | 4000 | No |
| Viton 884-75 | Teflon | Rectangular; no split | 0.010 | 400 | 3250 | No |
| Viton 884-75 | Teflon | Rectangular; no split | 0.010 | 500 | 3250 | Yes |
| Kalrez 1045 | Teflon | Rectangular; no split | 0.008 | 275 | 3200 | Yes |
| Kalrez 1045 | Aluminum | Rectangular; split | 0.010 | 510 | 3400 | Yes |

-continued

| Sealing Ring Material | Backup Ring Material | Backup Ring Design | Gap Width (inches) | Temperature (° F.) | Pressure (psia) | Failure |
|---|---|---|---|---|---|---|
| Kalrez 1045 | Aluminum | Arcuate 10° split | 0.010 | 505 | 2800 | Yes |
| Viton 747-75 | Aluminum | Arcuate 5° split | 0.010 | 520 | 3400 | No |
| Kalrez 1045 | Aluminum | Arcuate 5° split | 0.010 | 520 | 3200 | After test over and ring cool |
| Viton 747-75 | Aluminum | Arcuate 5° split | 0.010 | 520 | 3200 | No |

The Teflon backup rings had no split, but because of the plastic nature of Teflon, under the heat and pressure of the test conditions the Teflon flowed or extruded into the gap, thus damaging the backup rings. Consequently, even when there was no failure, the Teflon backup rings were not satisfactory.

Although the present invention has been described with reference to preferred embodiments, rearrangements, alterations and substitutions can be made, and still the result will be within the scope of the invention.

What is claimed is:

1. A sealing ring assembly comprising:
   a first pipe member having an inner circumferential surface;
   a second nine member having an outer circumferential surface mated with said first pipe member inner circumferential surface to provide a pipe joint, said second pipe member having a sealing chamber adjacent the pipe joint;
   an annular sealing ring within said sealing chamber to provide a fluid seal of the pile joint, said annular sealing ring having an upstream annular surface and a downstream annular surface;
   an annular backup ring within the sealing chamber and having an upstream annular surface and a downstream annular surface, said annular backup ring downstream annular surface being substantially flat, and said annular backup ring upstream annular surface being arcuate, said annular backup ring upstream annular surface being adjacent said sealing ring downstream annular surface, said annular backup ring having a split therein to permit radial expansion of said annular backup ring, said annular backup ring having a greater thickness on its outer periphery than on its inner periphery to permit pressure of said annular sealing ring against said annular backup ring upstream annular surface to expand said annular backup ring radially.

2. A sealing ring assembly as claimed in claim 1, wherein said annular backup ring upstream annular surface has a contour substantially the same as the contour of said annular sealing ring downstream annular surface.

3. A sealing ring assembly as claimed in claim 1, wherein said annular backup ring is made of metal.

4. A sealing ring assembly as claimed in claim 3, wherein said annular backup ring is made of aluminum.

5. A sealing ring assembly as claimed in claim 3, wherein said annular backup ring is made of titanium.

6. A sealing ring assembly as claimed in claim 3, wherein said annular backup ring is made of steel.

7. A sealing ring assembly as claimed in claim 1, wherein the split forms an acute angle with the backup ring upstream annular surface.

8. A sealing ring assembly as claimed in claim 7, wherein the angle is 10° or less.

9. A scaling ring assembly as claimed in claim 8, wherein the angle is 5°.

10. A sealing ring assembly comprising:
    a first pipe member having an inner circumferential surface;
    a second pipe member having an outer circumferential surface mated with said first pipe member inner circumferential surface to provide a pine joint, said second pipe member having a sealing chamber adjacent the pipe joint;
    an annular sealing ring within said sealing chamber to provide a fluid seal of the pipe joint, said annular sealing ring having an upstream annular surface and a downstream annular surface;
    an annular backup ring within the sealing chamber and having an upstream annular surface and a downstream annular surface, said annular backup ring having a triangular cross section, said annular backup ring upstream annular surface being adjacent said sealing ring downstream annular surface, said annular backup ring having a split therein to permit radial expansion of said annular backup ring, said annular backup ring having a greater thickness on its outer periphery than on its inner periphery to permit pressure of said annular sealing ring against said annular backup ring upstream annular surface to expand said annular backup ring radially.

11. A sealing ring assembly as claimed in claim 10, wherein said triangular cross section has angles of 30°, 60°, and 90°.

12. A sealing ring assembly as claimed in claim 10, wherein said annular backup ring is made of metal.

13. A sealing ring assembly as claimed in claim 12, wherein said annular backup ring is made of aluminum.

14. A sealing ring assembly as claimed in claim 12, wherein said annular backup ring is made of titanium.

15. A sealing ring assembly as claimed in claim 12, wherein said annular backup ring is made of steel.

16. A sealing ring assembly as claimed in claim 10, wherein the split forms an acute angle with the backup ring upstream annular surface.

17. A sealing ring assembly as claimed in claim 16, wherein the angle is 10° or less.

18. A sealing ring assembly as claimed in claim 17, wherein the angle is 5°.

* * * * *